United States Patent
Girbig et al.

(10) Patent No.: US 8,297,835 B2
(45) Date of Patent: Oct. 30, 2012

(54) METHOD AND REGULATION SYSTEM FOR MONITORING A COMPRESSOR OF A GAS TURBINE IN PARTICULAR

(75) Inventors: Paul Girbig, Uttenreuth (DE); Michael Willsch, Fürth (DE)

(73) Assignee: Siemens Aktiengesellschaft, München (DE)

( * ) Notice: Subject to any disclaimer, the term of this patent is extended or adjusted under 35 U.S.C. 154(b) by 957 days.

(21) Appl. No.: 11/587,468

(22) PCT Filed: Apr. 21, 2005

(86) PCT No.: PCT/EP2005/051780
§ 371 (c)(1),
(2), (4) Date: Oct. 25, 2006

(87) PCT Pub. No.: WO2005/106209
PCT Pub. Date: Nov. 10, 2005

(65) Prior Publication Data
US 2008/0095612 A1 Apr. 24, 2008

(30) Foreign Application Priority Data

Apr. 27, 2004 (EP) ..................................... 04009998

(51) Int. Cl.
*G01K 13/02* (2006.01)
*G01N 5/08* (2006.01)

(52) U.S. Cl. ............ 374/130; 374/141; 374/147; 374/4; 356/43; 415/118

(58) Field of Classification Search .................. 374/120, 374/121, 130, 131, 141, 144, 147, 148, 137, 374/135, 134, 29, 30, 43–45, 57, 16, 4, 1, 374/102, 103, 104, 107, 110, 109, 115, 166, 374/143, 159, 161; 415/118
See application file for complete search history.

(56) References Cited

U.S. PATENT DOCUMENTS

| | | | | | |
|---|---|---|---|---|---|
| 2,741,919 | A | * | 4/1956 | Gaubatz | 374/144 |
| 3,048,012 | A | * | 8/1962 | Slatter | 60/39.281 |
| 4,043,197 | A | * | 8/1977 | Mounteer et al. | 73/861.02 |
| 4,058,975 | A | * | 11/1977 | Gilbert et al. | 60/39.281 |
| 4,253,603 | A | * | 3/1981 | Johnson | 236/86 |
| 4,573,327 | A | * | 3/1986 | Cochran | 62/238.6 |
| 4,742,689 | A | * | 5/1988 | Lowes | 62/197 |
| 4,744,670 | A | * | 5/1988 | Janssen | 374/144 |
| 4,763,973 | A | * | 8/1988 | Inoue et al. | 385/12 |
| 4,870,270 | A | * | 9/1989 | Brennan | 250/227.21 |
| 4,967,382 | A | * | 10/1990 | Hall | 700/278 |
| 5,026,171 | A | * | 6/1991 | Feller | 374/41 |
| 5,306,088 | A | | 4/1994 | Zoerner | |
| 5,533,329 | A | * | 7/1996 | Ohyama et al. | 60/773 |
| 5,803,607 | A | * | 9/1998 | Jones et al. | 374/161 |
| 5,811,816 | A | * | 9/1998 | Gallagher et al. | 250/370.15 |
| 5,892,860 | A | * | 4/1999 | Maron et al. | 385/12 |

(Continued)

FOREIGN PATENT DOCUMENTS

JP    06070435   A   *   3/1994

(Continued)

*Primary Examiner* — Gail Verbitsky

(57) ABSTRACT

A regulation system for a compressor comprises a fiber-optic lattice sensor which makes it possible to determine a flow temperature of a fluid to be compressed by means of the compressor. Another aspect of the invention relates to a use of a fiber-optic Bragg lattice sensor as a temperature sensor in a regulation system.

12 Claims, 2 Drawing Sheets

U.S. PATENT DOCUMENTS

| | | | |
|---|---|---|---|
| 6,317,538 B1 * | 11/2001 | Shigehara et al. | 385/37 |
| 6,402,372 B1 * | 6/2002 | Saunders | 374/179 |
| 6,513,971 B2 * | 2/2003 | Tubbs | 374/144 |
| 6,516,117 B1 * | 2/2003 | Fujimaki et al. | 385/37 |
| 6,671,055 B1 * | 12/2003 | Wavering et al. | 356/478 |
| 6,740,866 B1 * | 5/2004 | Bohnert et al. | 250/227.14 |
| 6,923,048 B2 * | 8/2005 | Willsch et al. | 73/112.01 |
| 6,928,202 B2 * | 8/2005 | Pickrell et al. | 385/12 |
| 7,047,158 B2 * | 5/2006 | Roba et al. | 702/182 |
| 7,251,932 B2 * | 8/2007 | Huang | 60/297 |
| 7,281,415 B2 * | 10/2007 | Johansen | 73/61.45 |
| 7,302,844 B2 * | 12/2007 | Birkle et al. | 73/204.23 |
| 7,344,528 B1 * | 3/2008 | Tu et al. | 606/7 |
| 7,421,162 B2 * | 9/2008 | McCarthy et al. | 385/37 |
| 7,469,078 B2 * | 12/2008 | Niewczas et al. | 385/13 |
| 2002/0057859 A1 * | 5/2002 | Walter et al. | 385/13 |
| 2002/0154860 A1 * | 10/2002 | Fernald et al. | 385/37 |
| 2003/0066359 A1 * | 4/2003 | Gysling et al. | 73/861.23 |
| 2004/0128985 A1 * | 7/2004 | Shimasaki et al. | 60/286 |
| 2005/0129088 A1 * | 6/2005 | Rajendran et al. | 374/161 |
| 2005/0165581 A1 * | 7/2005 | Roba et al. | 702/182 |
| 2006/0146909 A1 * | 7/2006 | Morse et al. | 374/130 |
| 2008/0304955 A1 * | 12/2008 | Zacherl | 415/17 |
| 2009/0087303 A1 * | 4/2009 | Ruggiero et al. | 415/118 |
| 2009/0242034 A1 * | 10/2009 | Morrison | 137/2 |

FOREIGN PATENT DOCUMENTS

WO      WO 02062603 A1 *    8/2002

* cited by examiner

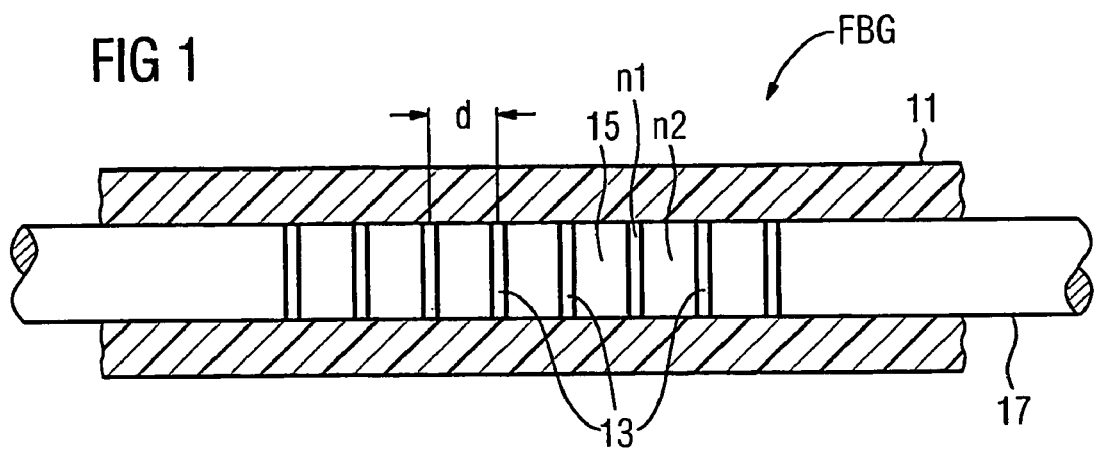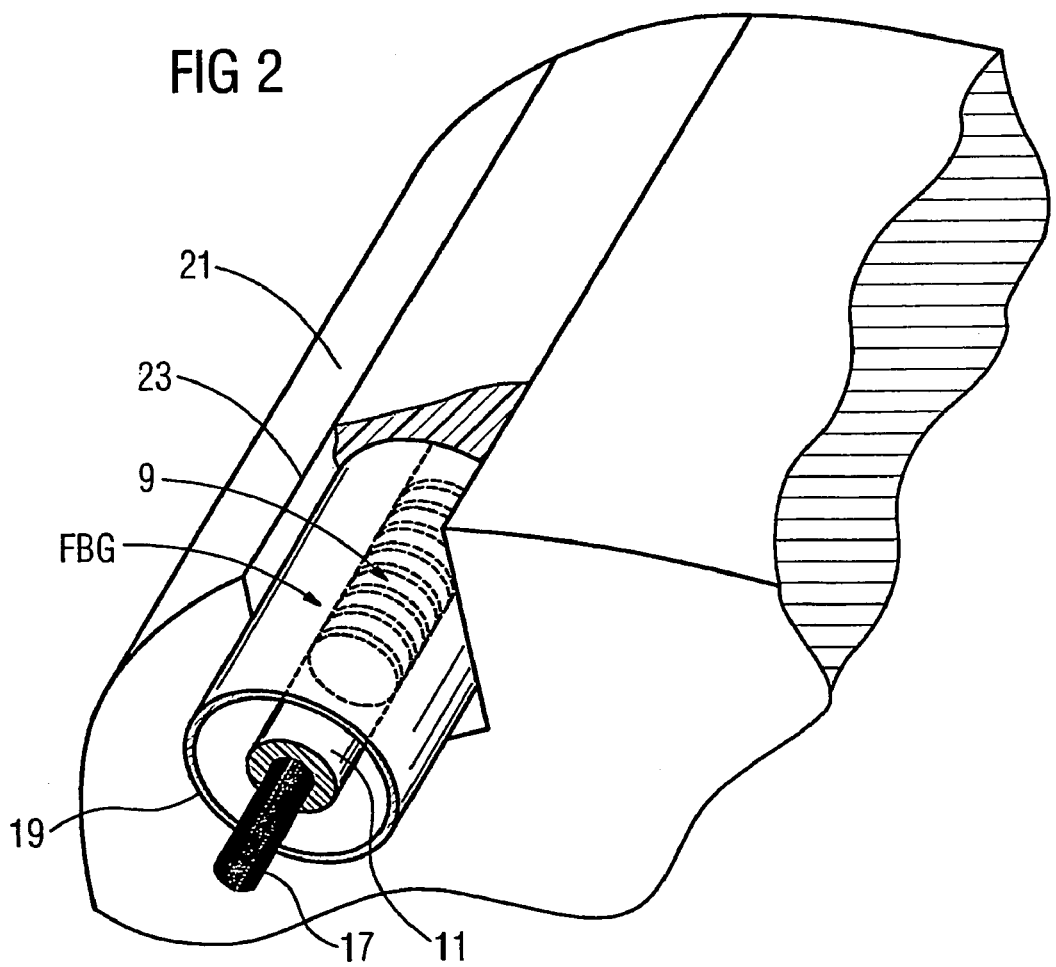

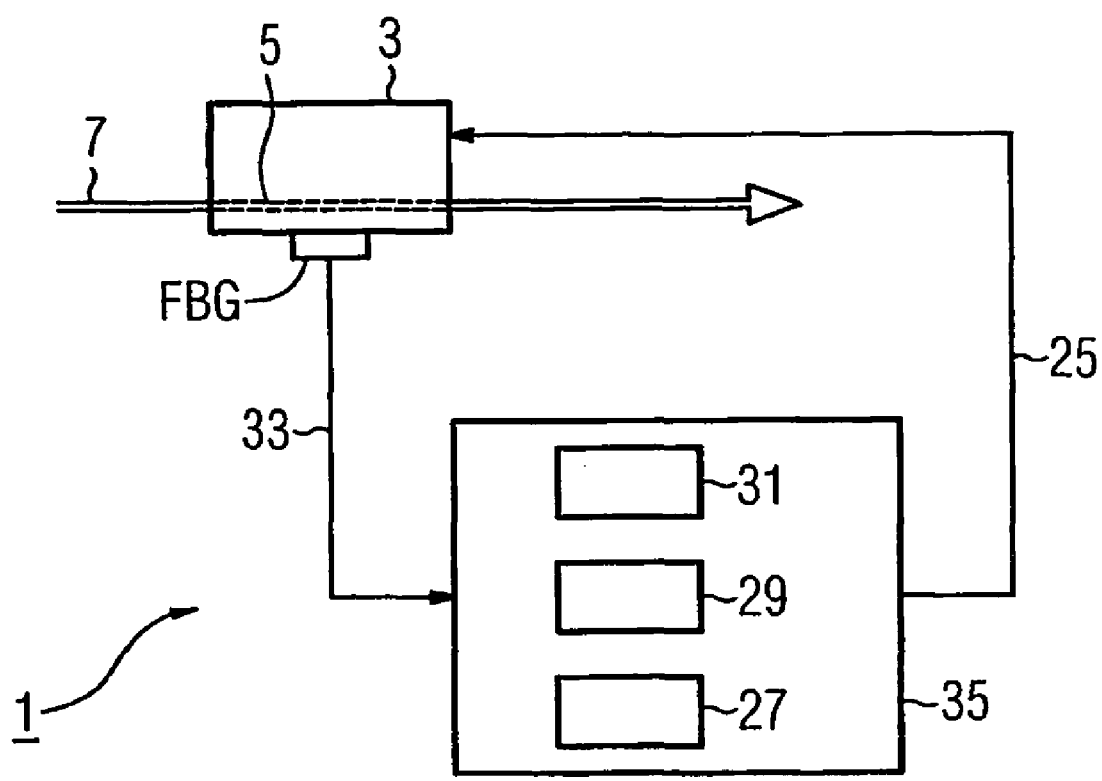

METHOD AND REGULATION SYSTEM FOR MONITORING A COMPRESSOR OF A GAS TURBINE IN PARTICULAR

CROSS REFERENCE TO RELATED APPLICATIONS

This application is the US National Stage of International Application No. PCT/EP2005/051780, filed Apr. 21, 2005 and claims the benefits of European Patent application No. 04009998.8 filed Apr. 27, 2004. All of the applications are incorporated by reference herein in their entirety.

FIELD OF INVENTION

The invention relates to a method and regulation system for monitoring a compressor of a gas turbine in particular.

BACKGROUND OF THE INVENTION

In a number of technical plants, for example power plants for power generation, compressors and compressor units are used to compress different gaseous and/or liquid fluids and deliver them for further use.

In the case of a gas turbine plant for example the air taken in is compressed by means of a compressor before it is fed into the combustion chamber.

To ensure reliable turbine operation, there is provision for temperature monitoring, of turbine blades for example, according to U.S. Pat. No. 5,306,088. Optical fibers are used for temperature acquisition.

For safe and non-destructive operation the quantity delivered must not drop below what is known as the critical delivery rate (also referred to as the pump limit or stability limit). Should the fluid flow to be processed instantaneously by a compressor be less than said critical delivery rate of the compressor, it is possible for the flow to cease suddenly during the compression process, on the compressor blades in particular, whereupon a mechanical overload is possible, as this causes much higher instantaneous pressures to occur than during normal operation. It can also result in the unwanted generation of low-frequency vibration and it is also possible for the compressor to overheat.

To achieve the highest possible level of efficiency of the compressor, its working point is frequently set as close as possible to its pump limit or its so-called maximum absorption capacity.

Values should however not be below or above the two limit values mentioned where possible during operation, in order to prevent damage to the plant.

A regulation system is therefore required for most compressors used in technical plants.

In the case of known regulation systems a model of the flow phenomena is used for example, with limit characteristics being determined for operation, which should not be infringed.

Depending on the quality of the model used for the flow phenomena and the accuracy of measurements taken during a commissioning phase, relative optimization of the working point can be effected and it can be moved closer to the limit characteristics.

However it is not possible in this process to dispense with a safety interval in relation to the limit characteristics, as known measuring methods, for temperature acquisition for example, can only be used in individual cases because of the high pressures and temperatures in the compressors. It is therefore very difficult to determine the pump limit of a compressor during the commissioning phase, without causing an unwanted high load level to occur.

SUMMARY OF INVENTION

The object of the invention is therefore to specify an improved regulation system for a compressor. It is intended that it should in particular allow a higher level of efficiency of the compressor to be achieved.

According to the invention the object is achieved by a method and a regulation system as claimed in the claims.

The invention is thereby based on the consideration that the flow temperature of the fluid flow can be used to detect an incipient cessation of the flow of the fluid.

Before cessation of flow occurs in a compressor, the temperature increases in the flow. This is due to the fact that the imminent flow cessation means that a mass volume of compressed fluid is subjected to the energy from the compressor impeller a number of times. This causes the temperature of the fluid to rise significantly within a very short time period of for example less than 1 s, as the compressor wheel now outputs its energy to the fluid in the form of frictional heat and does not invest in the transportation of the fluid.

As said temperature rise takes place within a short time period, it cannot be determined using conventional sensor technology and with the required accuracy.

A fiber-optic Bragg lattice sensor is therefore provided in an inventive regulation system, which can be used to determine said temperature quickly and with an adequate degree of accuracy.

Therefore in an inventive regulation system, in contrast to known systems, there is no need for compensatory detection of pressures in the fluid flow. In the prior art pressure sensors are used to detect and measure the formation of pressure waves in the fluid flow. However the pressure sensors can only register the pressure surges when the flow cessation has already occurred. In contrast an inventive regulation system can be used [to detect] an imminent flow cessation by determining the flow temperature of the fluid to be compressed, as this has a characteristic temperature profile.

The fiber-optic Bragg lattice sensor or an additional Bragg lattice sensor can also be used to determine pressure fluctuations in the fluid and material stresses in respect of the compressor.

One important advantage of an inventive regulation system is that reliable determination of an imminent flow cessation allows the working point of the compressor to be moved closer to the stability limit of the compressor. This allows the level of efficiency to be increased.

Also in an inventive regulation system there is no need to determine the limit characteristics of the compressor in material loading tests in the course of practical experiments before said compressor enters into normal operation.

Finally the efficiency of an inventive regulation system can be applied to every operating state of the compressor and every state and composition of the fluid, in contrast to the known limit characteristics, which are a function of the fluid state.

In one advantageous embodiment the Bragg lattice sensor comprises an optical waveguide, having at least two regions with different refractive indices.

If light of a white color spectrum is now directed into the optical waveguide, monochromatic reflection of a specific wavelength occurs as a result of deliberate interference in the optical waveguide.

This wavelength is determined by the selected values for the refractive indices and the distance between the regions with different refractive indices.

The application of stress to the optical waveguide—for example by pulling, compressing or bending—results in a change in the distance between two regions with the same refractive index and therefore to a change in the wavelength of the reflected light. The Bragg lattice sensor can therefore be operated as a pressure sensor, to detect mechanical stresses in a quantitative manner for example.

If the Bragg lattice sensor is exposed to a flow temperature, as provided for in an inventive regulation system, the refractive index of one region of the Bragg lattice sensor at least changes and the wavelength of the reflected light is displaced as a function of the temperature pattern.

If it is ensured that the Bragg lattice sensor is not subjected to mechanical stress when used as a temperature sensor, the adjusting wavelength of the reflected light is a measure of the flow temperature prevailing in the fluid flow.

If both a temperature measurement and a pressure measurement are required, several, in particular two, Bragg lattice sensors can be connected one behind the other, the temperature sensor having to be protected against the action of mechanical stresses, to exclude a dependency of its reflected wavelength on mechanical stress influences and restrict it to a dependency on the temperature to be measured.

A further important advantage of the Bragg lattice sensor, in particular for temperature measurement, compared with known sensors is its practically negligible time constant. A change in the temperature to be measured results in an immediate change in the reflected wavelength, without transient or relaxation phenomena occurring.

Further preferred embodiments will emerge from the subclaims.

BRIEF DESCRIPTION OF THE DRAWINGS

An exemplary embodiment of the invention is shown in more detail below, with reference to the figures, in which:

FIG. 1 shows a fiber-optic Bragg lattice sensor for use in an inventive regulation system, FIG. 2 shows a fiber-optic Bragg lattice sensor as a temperature sensor and FIG. 3 shows an inventive regulation system for a compressor.

DETAILED DESCRIPTION OF INVENTION

FIG. 1 shows a Bragg lattice sensor FBG. Said sensor comprises an optical waveguide 11 with an optical fiber 17.

The optical fiber 17 has at least two regions 13, 15 having different refractive indices n1, n2 from each other.

The distance between two regions with the same refractive index is marked d.

The Bragg lattice sensor FBG can thereby be an integral part of an optical waveguide cable, which can have an overall length of 1 km or more. The regions with different refractive indices n1, n2 can thereby be understood as optical lenses, the refractive indices n1, n2 and the distance d being design variables.

The Bragg lattice sensor FBG can be produced by incorporating the above-mentioned lens characteristics into the optical fiber 17 using a UV laser and an exposure mask.

The Bragg lattice sensor FBG can have a linear expansion of approximately 5 mm for example.

The action of mechanical stress on the Bragg lattice sensor FBG causes the distance d to change due to pulling, bending or compressing. Subjecting the Bragg lattice sensor FBG to a changing temperature results in a change in at least one of the refractive indices n1, n2.

Both a change in the distance d and a change in at least one of the refractive indices n1, n2 result in a characteristic displacement of the wavelength of the monochromatic reflection and are therefore a measure of a mechanical or temperature stress.

FIG. 2 shows a temperature sensor 9, comprising a Bragg lattice sensor FBG.

The Bragg lattice sensor FBG thereby comprises at least one section of an optical waveguide 11 with an optical fiber 17.

So that the temperature sensor 9 can be used to take the most accurate temperature measurement possible, the Bragg lattice sensor FBG must be protected against mechanical stress, in particular the action of pressure forces, as these would falsify the measurement results due to a displacement of the monochromatic reflected light because of the change in the distance d due to the action of the pressure. To prevent this, the optical waveguide 11 of the temperature sensor 9 is inserted loosely in a steel casing 19, so that external mechanical forces cannot act on the optical waveguide 11 and in particular not on the Bragg lattice sensor FBG.

A measurement object 21 can be a machine housing of a compressor for example. The temperature sensor 9 is then inserted into a measuring channel 23 of the housing and welded to the housing.

Where the temperature of a fluid is to be measured, the fluid is passed through the measuring channel 23.

The width of the measuring channel can be 1 mm or even less.

FIG. 3 shows an inventive regulation system 1 for a compressor 3.

The compressor 3 is thereby used to compress a fluid 7, which is directed through the compressor 3.

A Bragg lattice sensor FBG is provided to detect an imminent cessation of the flow of the fluid 7. This sensor can also be used to determine significant and short-term temperature changes in relation to a flow temperature 5 of the fluid 7, as the sensor has practically no transient and relaxation time constants.

At least one signal from the Bragg lattice sensor FBG is transmitted as a temperature measurement value 33 characterizing the flow temperature 5 to a processing unit 35.

The processing unit 35 can comprise gradient detection 27, a neural network 29 and a mathematical model 31 as alternatives or in combination.

Gradient detection 27 allows the temperature measurement value 33 to be evaluated to determine whether there is a rapid and/or significant temperature change in respect of the flow temperature 5.

The neural network 29 can have a learned temperature response in respect of a stable flow and can be designed to be self-learning, in order to be able to detect even non-stable flow conditions, in particular flow cessations, before they occur.

The mathematical model 31 can be a conventional model, which is used to simulate a compression process, which is carried out by means of the compressor 3.

The processing unit 35 supplies a control signal 25 to the compressor 3, to protect the compressor 3 as required by withdrawing power or opening bypass valves, when the start of a flow cessation has been determined by means of the Bragg lattice sensor FBG or by means of the temperature measurement value 33 and one or more of said evaluation units 27, 29, 31.

Gradient detection 27 is used in particular to detect a rapid rise in the temperature of the fluid 7. Such a temperature rise alone can be a reliable indication of an imminent flow cessation.

The accuracy and response behavior of the regulation system 1 can be determined very precisely by linking the results of the evaluation units 27, 29 and 31.

The invention claimed is:

1. A method for monitoring cessation of a fluid flow of a gas turbine compressor, comprising:
   arranging a fiber-optic Bragg lattice sensor in the compressor fluid flow to monitor the temperature of the fluid flow to be compressed;
   sensing a temperature of the fluid flow to be compressed via the Bragg sensor;
   transmitting a signal of the Bragg sensor to a processing unit where the transmitted signal represents a temperature measurement value of the compressor fluid flow;
   analyzing the transmitted signal by the processing unit to determine a temperature rise from the temperature sensed by the Bragg sensor; and
   determining, by the processing unit, if an increase in temperature of the compressor fluid flow has occurred over a time period indicative that a flow cessation is imminent.

2. The method as claimed in claim 1, wherein the Bragg lattice sensor comprises an optical waveguide having a plurality of regions with different refractive indices.

3. The method as claimed in claim 2, wherein a measuring channel is provided in a housing of the compressor where the fluid flows.

4. The method as claimed in claim 3, wherein a temperature gradient detection takes place in the processing unit based on a temperature change of the compressor fluid flow over a time period of less than one second.

5. The method as claimed in claim 3, wherein the temperature measurement value and the increase in temperature of the compressor fluid flow are components of an actual temperature profile and imminent flow cessation is determined by comparing a characteristic temperature profile with the actual temperature profile.

6. The method as claimed in claim 4, wherein the processing unit comprises a self-learning neural network.

7. The method as claimed in claim 6, wherein the processing unit simulates a compression process of the gas turbine compressor using a mathematical model.

8. The method as claimed in claim 7, wherein the processing unit supplies a control signal that influences the instantaneous operation of the compressor as a function of the temperature measurement value.

9. A regulation system configured to monitor cessation of a compressor flow of a gas turbine, comprising:
   a fiber-optic Bragg lattice sensor arranged in the flow stream of the compressor that measures the temperature of the flow during operation of the compressor to monitor the temperature of the fluid flow to be compressed; and
   a processing unit is configured to evaluate the measured flow temperature and determine if an increase in temperature of the compressor fluid flow has occurred over a time period indicative that a flow cessation is imminent.

10. The system as claimed in claim 9, wherein the Bragg lattice sensor comprises an optical waveguide having a plurality of regions with different refractive indices.

11. The system as claimed in claim 10, wherein a temperature gradient detection takes place in the processing unit based on a temperature change of the compressor fluid flow over a time period of less than one second.

12. The system as claimed in claim 11, wherein the processing unit comprises a self-learning neural network.

* * * * *